(12) United States Patent
Poulain et al.

(10) Patent No.: US 9,723,339 B2
(45) Date of Patent: Aug. 1, 2017

(54) METHOD FOR GENERATING A TIME MARKING FOR SYNCHRONOUS TERRESTRIAL BROADCASTING

(71) Applicants: ENENSYS TECHNOLOGIES, Cesson Sevigne (FR); TDF, Montrouge (FR)

(72) Inventors: Ludovic Poulain, Rennes (FR); Pascal Dupain, Montrouge (FR)

(73) Assignees: ENENSYS TECHNOLOGIES, Cesson Sevigne (FR); TDF, Montrouge (FR)

( * ) Notice: Subject to any disclaimer, the term of this patent is extended or adjusted under 35 U.S.C. 154(b) by 0 days.

(21) Appl. No.: 15/105,986

(22) PCT Filed: Dec. 17, 2014

(86) PCT No.: PCT/EP2014/078145
§ 371 (c)(1),
(2) Date: Jun. 17, 2016

(87) PCT Pub. No.: WO2015/091603
PCT Pub. Date: Jun. 25, 2015

(65) Prior Publication Data
US 2016/0323611 A1 Nov. 3, 2016

(30) Foreign Application Priority Data
Dec. 19, 2013 (FR) ..................................... 13 63096

(51) Int. Cl.
*H04N 7/173* (2011.01)
*H04N 21/236* (2011.01)
(Continued)

(52) U.S. Cl.
CPC ...... *H04N 21/23608* (2013.01); *H04H 20/67* (2013.01); *H04H 60/40* (2013.01);
(Continued)

(58) Field of Classification Search
CPC ................. H04N 21/23; H04N 21/234; H04N 21/23424; H04N 21/23608; H04N 21/23611
(Continued)

(56) References Cited

FOREIGN PATENT DOCUMENTS

| WO | 2010/043498 A1 | 4/2010 |
| WO | 2012/116743 A1 | 9/2012 |

OTHER PUBLICATIONS

Digital Video Broadcasting (DVB); Modulator Interface (T2-MI) for a second generation digital terrestrial television broadcasting system (DVB-T2); ETSI (European Telecommunications Standards Institute) TS 102 773 V1.1.1, Sep. 2009; 36 pp.
(Continued)

*Primary Examiner* — Dominic D Saltarelli
(74) *Attorney, Agent, or Firm* — Oliff PLC; R. Brian Drozd

(57) ABSTRACT

A method for generating time marking for synchronous terrestrial broadcasting in at least one single-frequency zone of at least one audiovisual stream via at least one connection in which the at least one audiovisual stream is multiplexed with at least one other audiovisual stream broadcast via the at least one connection, the method including: inserting packets including at least one item of information representing a common reference clock, detecting at least one packet including information representing the number of days elapsed since a predetermined date, calculating the number of loopbacks of a counter during a given period, updating the counter at each packet of the audiovisual stream transmitted, inserting at least one packet including the value of the updated counter in the audiovisual stream in order to form a modified audiovisual stream and transmitting the modified audiovisual stream.

11 Claims, 10 Drawing Sheets

(51) Int. Cl.
   *H04N 21/234* (2011.01)
   *H04N 21/23* (2011.01)
   *H04H 20/67* (2008.01)
   *H04H 60/40* (2008.01)
   *H04N 21/61* (2011.01)

(52) U.S. Cl.
   CPC ............ *H04N 21/23* (2013.01); *H04N 21/234* (2013.01); *H04N 21/23424* (2013.01); *H04N 21/23611* (2013.01); *H04N 21/6193* (2013.01)

(58) Field of Classification Search
   USPC .................................................. 725/32, 116
   See application file for complete search history.

(56) References Cited

OTHER PUBLICATIONS

"Digital Video Broadcasting (DVB); DVB mega-frame for Single Frequency Network (SFN) synchronization;" ETSI TS 101 191; V1.4.1; Jun. 2004; 18 pp.

"Information Technology—Generic Coding of Moving Pictures and Assocated Audio: Systems;" International Organisation for Standardisation; N0801; Nov. 13, 1994; 161 pp.

"Digital Video Broadcasting (DVB); Specification for Service Information (SI) in DVB systems;" ETSI EN 300 468; V1.8.1; Oct. 2007; 111 pp.

Feb. 20, 2015 Search Report issued in International Patent Application No. PCT/EP2014/078145.

METHOD FOR GENERATING A TIME MARKING FOR SYNCHRONOUS TERRESTRIAL BROADCASTING

The present invention relates to the field of the broadcasting of digital television programmes and more particularly a method for generating time marking for synchronous terrestrial broadcasting in at least one single-frequency zone of at least one audiovisual stream via a connection in which the at least one audiovisual stream is multiplexed with at least one other audiovisual stream broadcast via the connection.

In the broadcasting of audiovisual programmes, the data streams transmitted are time-marked to allow broadcasting thereof.

When at least one first data stream is multiplexed with other second data streams, it happens that the time marking of the at least one first data stream is modified. This modification prevents a device receiving the at least one multiplexed data stream from being able to find the original time marking of the at least one data stream. The device receiving the at least one data stream multiplexed with the second data streams cannot then synchronise the at least one first data stream for, for example and non-limitatively, SFN (single frequency network) broadcasting.

SFN broadcasting is characterised in that the broadcasting of the services is done by sending the same data stream via various transmitters on a single modulation frequency. Because of this, it is necessary for these various transmitters to receive exactly the same content and to be finely synchronised together in order to avoid generating interferences in the places situated at the junction of the coverage areas of the various transmitters.

This synchronisation between the various SFN transmitters may be done, for example, by inserting, in the stream distributed to these transmitters, synchronisation packets such as the T2-MI (T2-modulator interface) timestamp packets that correspond in the DVB-T2 standard to time labels, and MIP (mega frame initialisation packet) packets used in the DVB-H and DVB-T standards. This mechanism is described in the document: "Digital video broadcasting (DVB); DVB mega-frame for single frequency network (SFN) synchronization modulator interface (T2-MI) for a second generation digital terrestrial television broadcasting system (DVB-T2)" of the ETSI (European Telecommunications Standards Institute) under the reference ETSI TS 102 773 V1.1.1 (2009-09). The transmission point receiving the stream is then synchronised on the stream received, for example by means of these T2-MI packets of the DVB-T2 timestamp type. This synchronisation of the transmission point on the received stream causing the synchronisation of all the transmission points with each other is referred to as the SFN synchronisation of the transmission point.

SFN broadcasting is characterised by the definition of SFN zones. An SFN zone is a geographical area covered by a set of transmitters, the number of which is greater than or equal to one. These transmitters are finely synchronised and send exactly the same data stream on the same frequency.

The present invention aims to enable a device receiving the at least one data stream multiplexed with the second data streams to synchronise the at least one first data stream for broadcasting thereof.

The invention relates to a method for generating a time marking for synchronous terrestrial broadcasting in at least one single-frequency zone of at least one audiovisual stream via at least one connection in which the at least one audiovisual stream is multiplexed with at least one other audiovisual stream broadcast via the at least one connection, characterised in that the method comprises the steps of:
    inserting packets comprising at least one item of information representing a precise common reference clock,
    detecting, in the audiovisual stream, at least one packet comprising information representing the number of days elapsed since a predetermined date,
    calculating the number of loopbacks of a counter during a given period from the information representing the number of days elapsed since a predetermined date,
    updating the counter at each packet in the audiovisual stream transmitted,
    inserting at least one packet comprising the value of the updated counter in the audiovisual stream in order to form a modified audiovisual stream,
    transmitting the modified audiovisual stream for broadcasting of said modified audiovisual stream.

The invention also relates to a device for generating a time marking for synchronous terrestrial broadcasting in at least one single-frequency zone of at least one audiovisual stream via at least one connection in which the at least one audiovisual stream is multiplexed with at least one other audiovisual stream broadcast by the at least one connection, characterised in that the device comprises:
    means for inserting packets comprising at least one item of information representing a precise common reference clock,
    means for detecting, in the audiovisual stream, at least one packet comprising information representing the number of days elapsed since a predetermined date,
    means for calculating the number of loopbacks of a counter during a given period from the information representing the number of days elapsed since a predetermined date,
    means for updating the counter at each packet in the audiovisual stream transmitted,
    means for inserting at least one packet comprising the value of the updated counter in the audiovisual stream in order to form a modified audiovisual stream,
    means for transmitting the modified audiovisual stream for satellite broadcasting of said modified audiovisual stream.

Thus it is possible to synchronise the audiovisual stream for broadcasting thereof.

According to a particular embodiment of the invention, the or each inserted packet comprising the value of the updated counter is inserted in the audiovisual stream in place of a null packet of the audiovisual stream and in accordance with a given periodicity.

Thus the size of the audiovisual stream is preserved.

According to a particular embodiment of the invention, each packet comprising the value of the updated counter has the same identifier, different from the other identifiers included in the audiovisual stream.

Thus it is possible to easily recognise each packet comprising the value of the updated counter among all the packets received.

According to a particular embodiment of the invention, the calculation of the number of loopbacks of the counter during the given period from the information representing the number of days elapsed since a predetermined date is done by:
    converting the given period into a number of beats of a clock of the counter,
    calculating the number of clock beats of the counter equivalent to the period of the counter, converting the content of a field of the packet comprising at least one item of information representing a precise common reference clock into clock beats of the counter.

Thus it is possible to synchronise the audiovisual stream for broadcasting thereof.

According to a particular embodiment of the invention, at least one connection is a satellite connection.

The invention also relates to a method for filtering and synchronising at least one audiovisual stream for synchronous terrestrial broadcasting in at least one single-frequency zone, the audiovisual stream being received via at least one connection in which the at least one audiovisual stream is multiplexed with at least one other audiovisual stream broadcast by the at least one connection, characterised in that the method comprises the steps of:

filtering, among the packets received via the at least one connection, audiovisual packets intended for synchronous terrestrial broadcasting in at least one single-frequency zone and timestamping of the filtered packets, detecting packets comprising a counter, calculation of the period between two packets comprising a counter and counting of the packets between the two packets comprising a counter, detecting, in the audiovisual stream, at least one packet comprising information representing the number of days elapsed since a predetermined date, detecting packets comprising at least one item of information representing a precise common reference clock, inserting null packets between each packet comprising at least one item of information representing a precise common reference clock, timestamping each null packet, replacing each timestamped null packet with a filtered packet if the null packet has a timestamping higher than the filtered received packet, updating at least one packet comprising a counter in the audiovisual stream in order to form an audiovisual stream for synchronous terrestrial broadcasting in at least one single-frequency zone.

The invention also relates to a device for filtering and synchronising an audiovisual stream for synchronous terrestrial broadcasting in at least one single-frequency zone, the audiovisual stream being received via at least one connection in which the at least one audiovisual stream is multiplexed with at least one other audiovisual stream broadcast via the at least one connection, characterised in that the device comprises:

means for filtering, among the packets received via the at least one connection, audiovisual packets intended for synchronous terrestrial broadcasting in at least one single-frequency zone and timestamping of the filtered packets, means for detecting packets comprising a counter, calculation of the period between two packets comprising a counter and counting of the packets between the two packets comprising a counter, means for detecting, in the audiovisual stream, at least one packet comprising information representing the number of days elapsed since a predetermined date, means for detecting packets comprising at least one item of information representing a precise common reference clock, means for inserting null packets between each packet comprising at least one item of information representing a precise common reference clock, means for timestamping each null packet, means for replacing each timestamped null packet with a filtered packet if the null packet has a timestamping higher than the filtered received packet, means for updating at least one packet comprising a counter in the audiovisual stream in order to form an audiovisual stream for synchronous terrestrial broadcasting in at least one single-frequency zone.

Thus it is possible to synchronise the audiovisual stream for broadcasting thereof.

According to a particular embodiment of the invention, the method further comprises a step of putting the audiovisual stream for synchronous terrestrial broadcasting in at least one single-frequency zone in conformity with a transmission standard.

According to a particular embodiment of the invention, a plurality of tables are inserted in the audiovisual stream for synchronous terrestrial broadcasting in at least one single-frequency zone at a periodicity that depends on the periodicity of at least one bit of the counter.

The features of the invention mentioned above, as well as others, will emerge more clearly from a reading of the following description of an example embodiment, said description being given in relation to the accompanying drawings, among which:

Figure 1A:
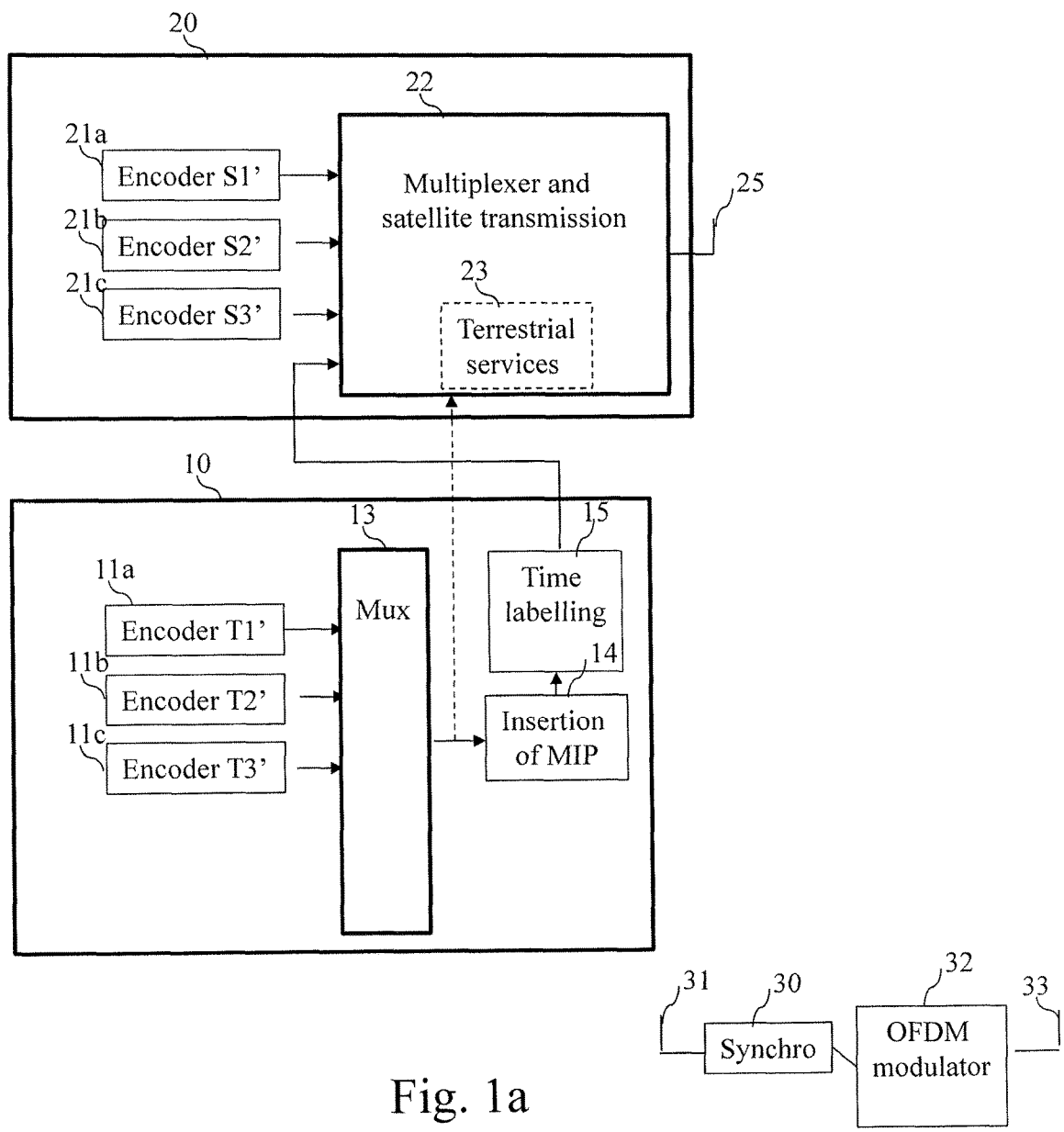
FIG. 1a illustrates a first example of architecture of a system using a satellite connection for transferring DVB streams to terrestrial-broadcasting devices according to the present invention.

The system comprises a device for forming at least one DVB stream 10 for synchronous terrestrial broadcasting in at least one single-frequency zone.

The device for forming at least one DVB stream 10 comprises a plurality of audiovisual-stream encoders 11a to $11_e$. The outputs of the audiovisual-stream encoders 11a to 11c are connected to a multiplexer 13 that multiplexes the various audiovisual streams produced by the encoders 11a and 11c. The output of the multiplexer 13 is connected to a module 14 for inserting MIP packets (the acronym for "Megaframe Initialisation Packets"). The output of the MIP-packet insertion module 14 is connected to a time-labelling module 15.

The MIP-packet insertion module 14 inserts, in the stream delivered by the multiplexer 13, MIP packets as described in ETSI TS 101 191. Each MIP packet indicates the start of a megaframe and comprises information representing a precise common reference clock, typically a GPS (the acronym for "Global Positioning System") clock. The stream thus formed is a DTT (the acronym for "Digital Terrestrial Television") stream. The time-labelling module 115 inserts in the DTT stream time labelling that enables terrestrial-broadcasting devices to carry out synchronous terrestrial broadcasting in a single-frequency zone.

The time labelling, in the form of packets containing a PCR field as described in ISO 13818-1, is preferentially introduced into the DDT stream in place of the null packets of the DTT stream at a periodicity of around 40 ms.

PCR is the acronym for "Program Clock Reference".

The DTT stream thus modified is transferred to a device for satellite broadcasting of at least one DVB stream 20.

The device for satellite broadcasting of at least one DVB stream 20 comprises a plurality of audiovisual-stream encoders 21a to 21c. The outputs of the audiovisual-stream encoders 21a to 21c are connected to a multiplexing and satellite-transmission module 22. The multiplexing and satellite-transmission module 22 multiplexes the various audiovisual streams produced by the encoders 21a and 21c as well as the TDT stream received from the device for forming at least one DVB stream 10. The output of the multiplexing and satellite-transmission module 22 is connected to a transmission antenna 25.

The data streams transmitted by the antenna 25 are received by a synchronisation and filtering device 30 via a satellite connection and by means of an antenna 31.

The synchronisation and filtering device 30 processes at least the packets containing a PCR field inserted by the time-labelling module 15 in order to provide synchronisation that enables an OFDM modulator 32 to carry out synchronous terrestrial broadcasting in a single-frequency zone.

In a variant, the MIP-packet insertion module 14 and time-labelling module 15, instead of being included in the device for forming at least one DVB stream 10, are implemented in the device for forming at least one DVB stream 20 under the reference 23 in FIG. 1a.

Figure 1B:
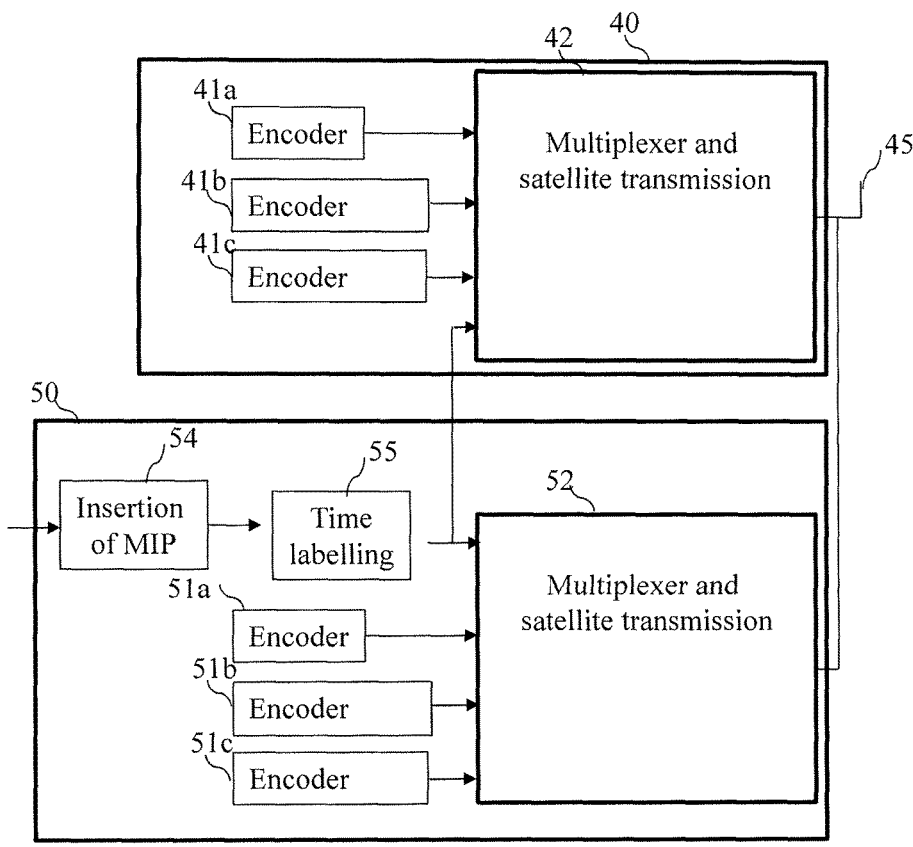
FIG. 1b illustrates a second example of architecture of a system using two satellite connections for transferring DVB streams to terrestrial-broadcasting devices according to the present invention.
Figure 1B:
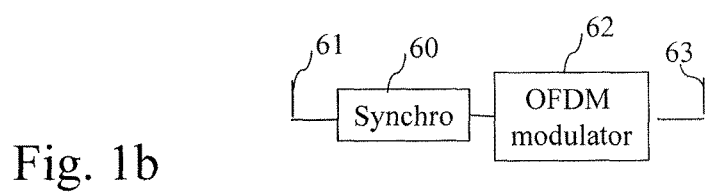

FIG. 1b illustrates a second example of architecture of a system using two satellite connections for transferring DVB streams to terrestrial-broadcasting devices according to the present invention.

The system comprises two satellite broadcasting devices 40 and 50 that each broadcast at least one DVB stream 20 for synchronous terrestrial broadcasting in at least one single-frequency zone.

The device for satellite broadcasting of a DVB stream 40 comprises a plurality of audiovisual-stream encoders 41a to 41c. The outputs of the audiovisual-stream encoders 41a to 41c are connected to a multiplexing and satellite-transmission module 42. The multiplexing and satellite-transmission module 42 multiplexes the various audiovisual-streams produced by the encoders 41a and 41c as well as the stream comprising the MIP packets and packets comprising time labelling inserted according to the present invention by the time-labelling module described below. The output of the multiplexing and satellite-transmission module 42 is connected to the transmission antenna 45.

The device for satellite broadcasting of a DVB stream 50 comprises a plurality of audiovisual-stream encoders 51a to 51c. The outputs of the audiovisual encoders 51a to 51c are connected to a multiplexing and satellite-transmission module 52.

The time-multiplexing module 52 is also connected to a time-labelling module 55 as well as to an MIP-packet insertion module 54.

The MIP-packet insertion module 54 inserts in a stream, consisting for example of null packets, MIP packets as described in ETSI ITS 101 191. Each MIP packet indicates the start of a megaframe and comprises information representing a precise common reference clock, typically a GPS (the acronym for "Global Positioning System") clock. The output of the MIP-packet insertion module 54 is connected to a time-labelling module 55.

The time-labelling module 55 carries out, in the stream delivered by the MIP-packet insertion module 54, time labelling that enables terrestrial-broadcasting devices to carry out synchronous terrestrial broadcasting in a single-frequency zone.

The time labelling, in the form of packets containing a PCR field as described in ISO 13818-1, is preferentially introduced into the stream delivered by the MIP-packet insertion module in place of null packets of the stream delivered by the MIP-packet insertion module at a periodicity of around 40 ms.

The stream thus modified is transferred to a device for the satellite broadcasting of at least one DVB stream 40.

The output of the multiplexing and satellite-transmission module 52 is connected to an antenna 55 for broadcasting of the data stream.

The data stream transmitted by the antenna 45 and the data stream transmitted by the antenna 55 are received by a synchronisation and filtering device 60 via two satellite connections and by means of one or more antennas 61.

The synchronisation and filtering device 50 processes at least the packets containing a PCR field inserted by the time-labelling module 55 in order to provide synchronisation that enables an OFDM modulator 62 to carry out a synchronous terrestrial broadcasting in a single-frequency zone.

Figure 2:
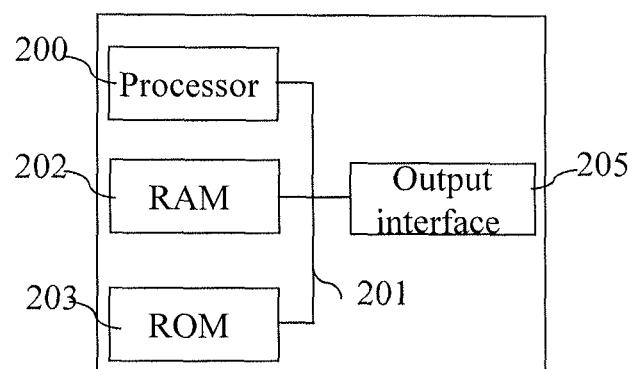
FIG. 2 depicts a module for generating time labelling for synchronous terrestrial broadcasting in a single-frequency zone.

FIG. 2 depicts a module for generating time labelling for synchronous terrestrial broadcasting in a single-frequency zone.

The time-label generating device 15 or 55 comprises a communication bus 201 to which there are connected a processor 200, a non-volatile memory 203, a random access memory 202, an interface 204 for communicating with or inputting to the multiplexer 11 and an interface 205 for communicating with or outputting from the modulator 15.

The non-volatile memory 203 stores the software modules implementing the invention, as well the data for using the algorithm that will be described hereinafter with reference to FIG. 5.

More generally, the programs according to the present invention are stored in a storage means. This storage means can be read by the microprocessor 200.

When the time-label generating device 15 or 55 is powered up, the software modules according to the present invention are transferred into the random access memory 202, which then contains the executable code of the invention as well as the data necessary for implementing the invention.

By means of an interface 205, the time-label generating device 15 transfers the DTT stream thus modified to the device for forming at least one DVB stream 20 for satellite broadcasting.

By means of the interface 205, the time-label generating device 55 transfers the stream thus modified to the multiplexing and satellite-transmission modules 42 and 52.

All or some of the steps of the algorithm described hereinafter with regard to FIG. 5 can be implemented by software by executing the steps by means of a programmable device such as a microprocessor, a DSP (Digital Signal Processor) or a microcontroller, or implemented in a component such as an FPGA (Field-Programmable Gate Array) or an ASIC (Application-Specific Integrated Circuit).

Figure 5:
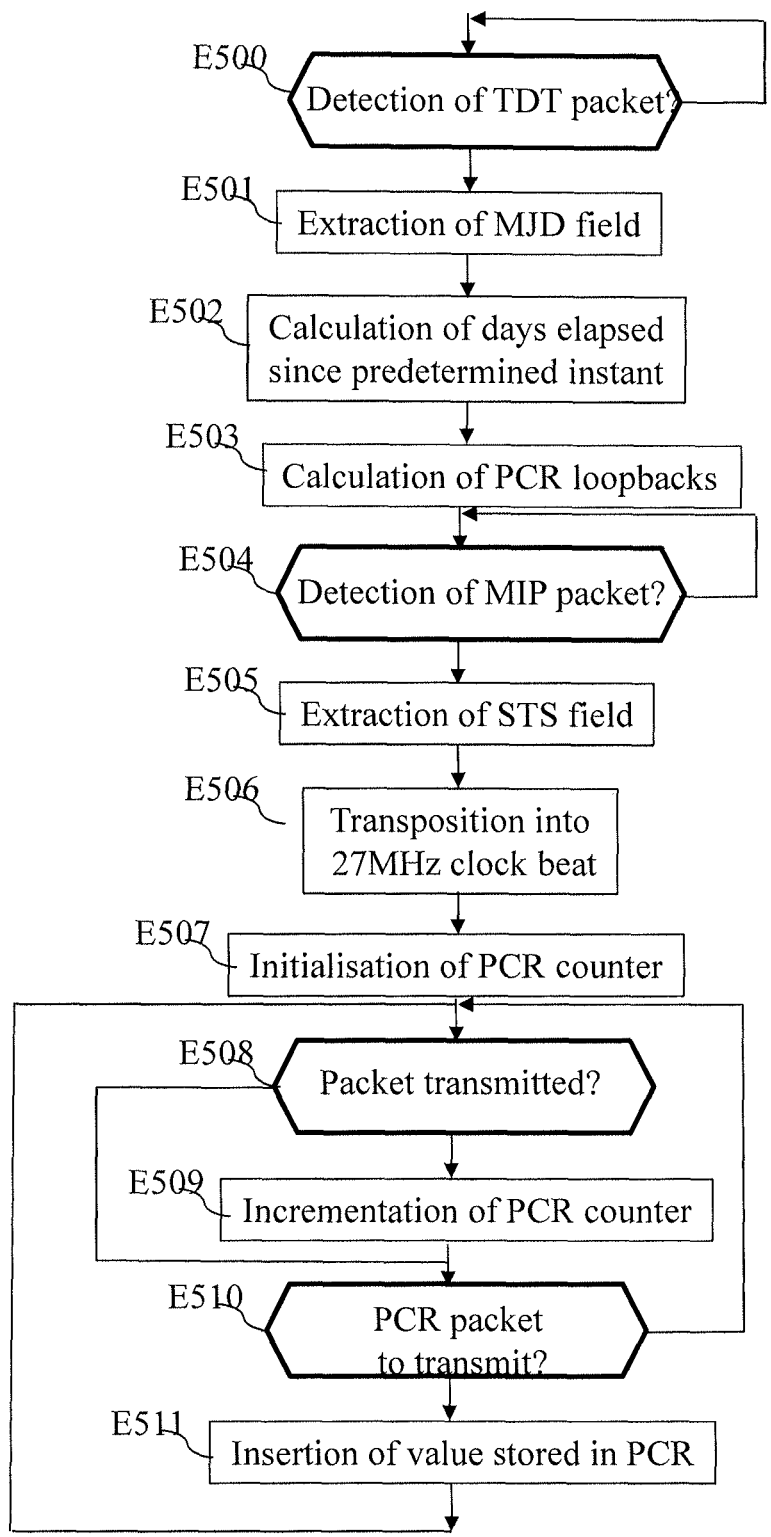
FIG. 5 shows an example of a time-labelling algorithm for synchronous terrestrial broadcasting in a single-frequency zone.

In other words, the time-label generating device 15 or 55 comprises circuitry that enables the time-label generating device 15 or 55 to execute the steps of the algorithm in FIG. 5.

Figure 3:
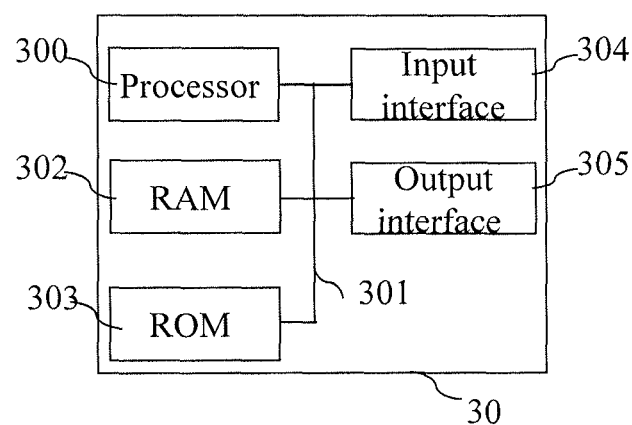
FIG. 3 depicts a device for synchronising at least one stream received via a satellite connection for synchronous terrestrial broadcasting in a single-frequency zone.

FIG. 3 depicts a device for synchronising and filtering at least one stream received by a satellite connection for synchronous terrestrial broadcasting in a single-frequency zone.

The synchronisation and filtering device 30 or 60 comprises a communication bus 301 to which there are connected a processor 300, a non-volatile memory 303, a random access memory 302, a signal reception interface and an output interface 305 with the OFDM modulator 32.

The non-volatile memory 303 stores the software modules implementing the invention, as well as the data for using the algorithm that will be described hereinafter with reference to FIGS. 6a to 6f.

More generally, the programs according to the present invention are stored in a storage means. This storage means can be read by the microprocessor 300.

When the synchronisation and filtering device 30 or 60 is powered up, the software modules according to the present invention are transferred into the random access memory 302, which then contains the executable code of the invention as well as the data necessary for implementing the invention.

By means of the interface 304, the synchronisation device 30 or 60 receives at least one satellite stream by means of the antenna 31 or 61.

By means of the interface 305, the synchronisation and filtering device 30 or 60 transfers at least one DVB stream to the OFDM modulator 32, which carries out a synchronous terrestrial broadcasting of the at least one DVB stream in a single-frequency zone.

All or some of the steps of the algorithms described hereinafter with regard to FIGS. 6a to 6f can be implemented by software by executing the steps by means of a programmable device such as a microprocessor, a DSP (digital signal processor) or a microcontroller, or be implemented in a component such as an FPGA (field-programmable gate array) or an ASIC (application-specific integrated circuit).

In other words, the synchronisation and filtering device 30 or 60 comprises circuitry that enables the synchronisation and filtering device 30 to execute the steps of the algorithms in FIGS. 6a to 6f.

Figure 4A:
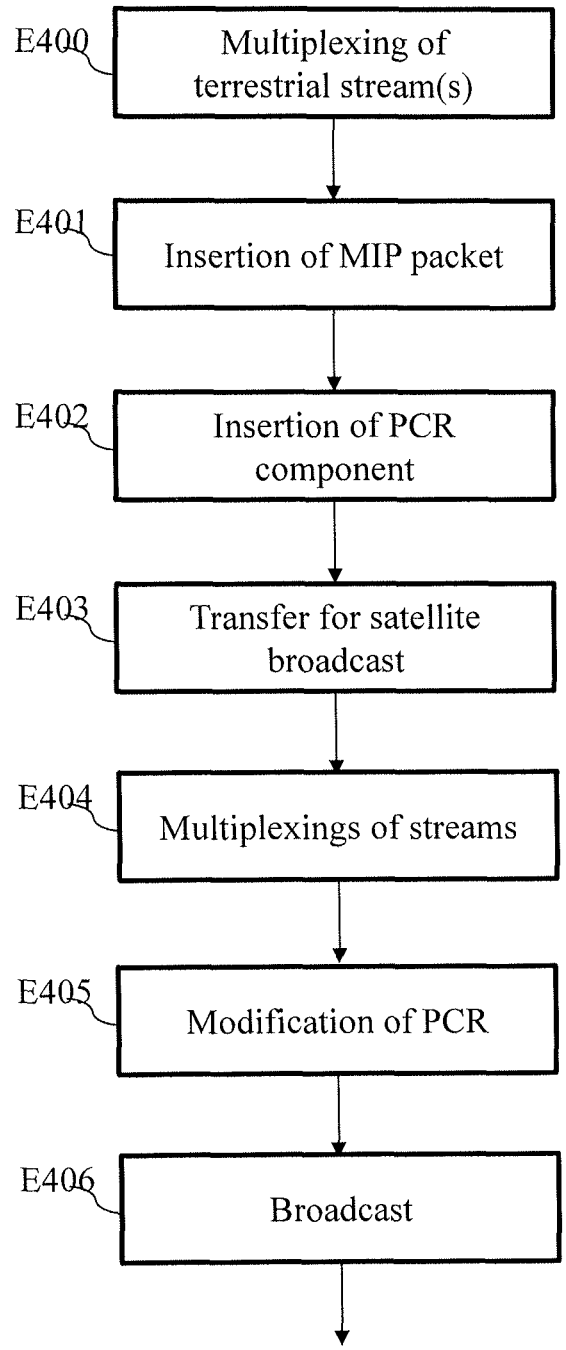
FIG. 4a shows an example of an algorithm for transferring at least one stream of a DVB stream by means of a satellite connection for synchronous terrestrial broadcasting in a single-frequency zone according to the first architecture example.

FIG. 4a shows an example of an algorithm for transferring at least one stream of a DVB stream by means of a satellite connection for synchronous terrestrial broadcasting in a single-frequency zone according to the first architecture example.

At step E400, the device for forming at least one DVB stream 10 multiplexes the various audiovisual streams produced by the encoders 11a and 11c.

At step E401, the device for forming at least one DVB stream 10 inserts megaframe initialisation MIP packets.

Each MIP packet indicates the start of a megaframe and comprises information representing a precise common reference clock, typically a GPS clock. The stream thus formed is a DTT stream.

At step E402, the device for forming at least one DVB stream 10 carries out a time labelling.

The device for forming at least one DVB stream 10 inserts, in the DTT stream, time labelling that enables terrestrial-broadcasting devices to carry out synchronous terrestrial broadcasting in a single-frequency zone.

The time labelling, in the form of packets containing a PCR field, is preferentially introduced into the DTT stream in place of null packets of the DTT stream at a periodicity of around 40 ms, which can be defined by the user of the device for forming at least one DVB stream 10.

The packets containing a PCR field used as time labelling enabling terrestrial-broadcasting devices to carry out synchronous terrestrial broadcasting in a single-frequency zone have the same identifier, different from the other identifiers included in the DTT stream.

The packets containing a PCR field used as time labelling enabling terrestrial-broadcasting devices to carry out synchronous terrestrial broadcasting in a single-frequency zone have the same identifier that identifies a so-called reference service.

The time labelling will be described in more detail with reference to FIG. 5.

At step E403, the device for forming at least one DVB stream 10 transfers the DTT stream to the device for satellite broadcasting of at least one DVB stream 20.

At step E404, the device for satellite broadcasting of at least DVB stream 20 multiplexes the various audiovisual streams produced by the encoders 21a and 21c as well as the DTT stream received from the device for forming at least one DVB stream 10.

At step E405, the device for the satellite broadcasting of at least one DVB stream 20 modifies the packets containing a PCR field of at least one stream in accordance with the multiplexing carried out at step E44.

At step E406, the device for the satellite broadcasting of at least one DVB stream 20 transfers the at least one stream for satellite broadcasting thereof.

Figure 4B:
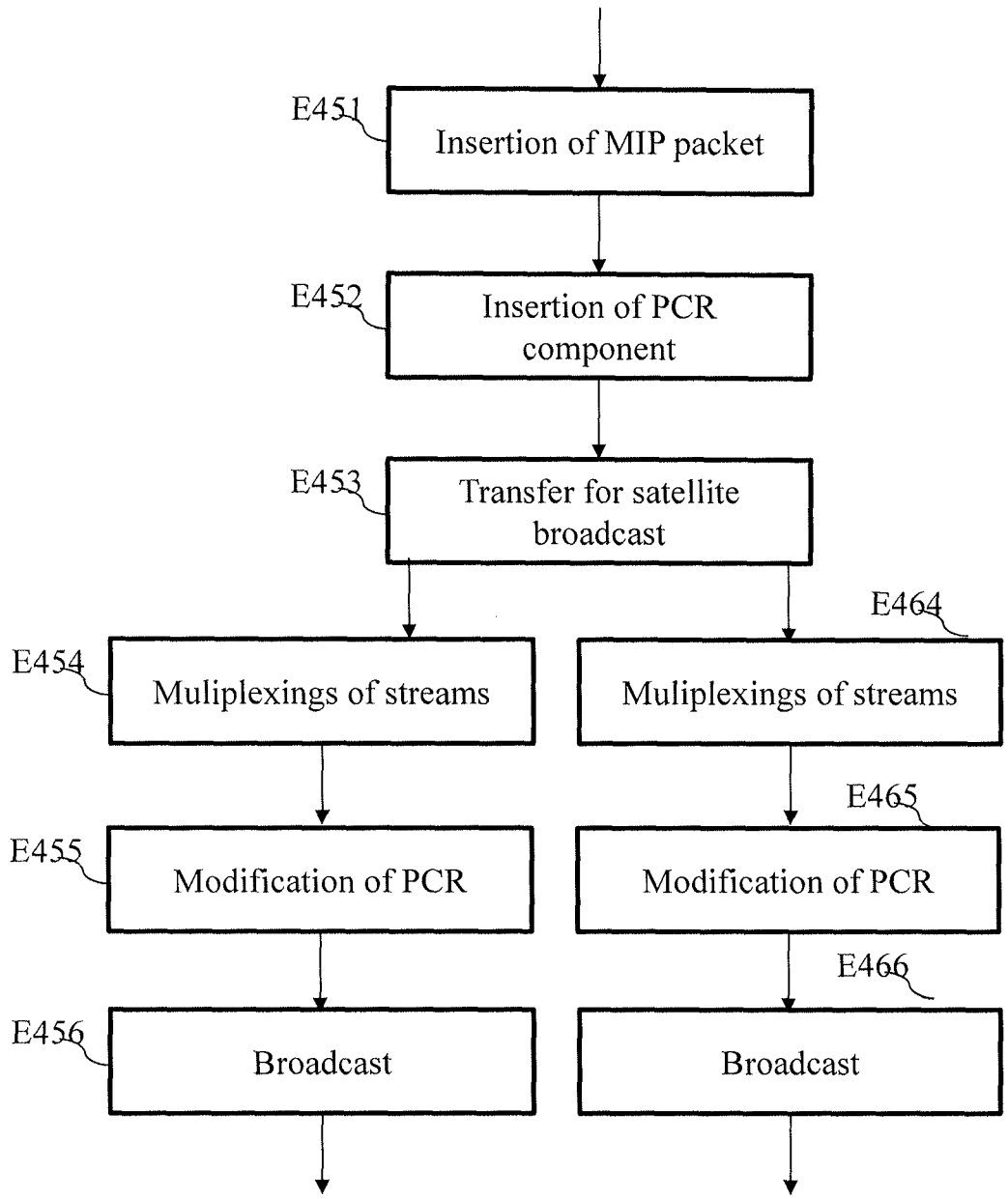
FIG. 4b depicts an example of an algorithm for transferring two DVB streams by means of a satellite connection for synchronous terrestrial broadcasting in a single-frequency zone according to the second architecture example.

FIG. 4b depicts an example of an algorithm for transferring two DVB streams by means of a satellite connection for synchronous terrestrial broadcasting in a single-frequency zone according to the second architecture example.

At step E451, the device for the satellite broadcasting of a DVB stream 50 inserts megaframe-initialisation MIP packets in a stream composed for example of empty packets.

Each MIP packet indicates the start of a megaframe and comprises information representing a precise common reference clock, typically a GPS clock.

At step E452, the device for the satellite broadcasting of a DVB stream 50 inserts time labelling.

The device for the satellite broadcasting of a DVB stream 50 inserts, in the stream in which the MIP packets were inserted, time labelling that enables terrestrial-broadcasting devices to carry out synchronous terrestrial broadcasting in a single-frequency zone.

The time labelling, in the form of packets containing a PCR field, is preferentially introduced into the stream in place of null packets at a periodicity of around 40 ms, which can be defined by the user of the device for the satellite broadcasting of a DVB stream 50.

The packets containing a PCR field used as time labelling enabling terrestrial-broadcasting devices to carry out synchronous terrestrial broadcasting in a single-frequency zone have the same identifier, different from the other identifiers included in the stream.

The packets containing a PCR field used as time labelling enabling terrestrial-broadcasting devices to carry out synchronous terrestrial broadcasting in a single-frequency zone have the same identifier that identifies a so-called reference service.

The time labelling will be described in more detail with reference to FIG. 5.

At step E453, the device for the satellite broadcasting of a DVB stream 50 transfers the stream formed at step E453 to the device for the satellite broadcasting of at least one DVB stream 40 and to the multiplexing and satellite-transmission module 52.

At step E454, the device for the satellite broadcasting of a DVB stream 50 multiplexes the various audiovisual streams produced by the encoders 51a and 51c as well as the stream formed at step E452.

At step E455, the device for the satellite broadcasting of a DVB stream 50 modifies the packets containing a PCR field of a stream in accordance with the multiplexing carried out at step E454.

At step E456, the device for the satellite broadcasting of a DVB stream 50 transfers the stream for satellite broadcasting thereof.

At step E464, the device for the satellite broadcasting of a DVB stream 40 multiplexes the various audiovisual streams produced by the encoders 41a and 41c as well as the stream formed at step E452.

At step E465, the device for the satellite broadcasting of a DVB stream 40 modifies the packets containing a PCT field of at least one stream in accordance with the multiplexing carried out at step E464.

At step E466, the device for the satellite broadcasting of a DVB stream 40 transfers the stream for satellite broadcasting thereof.

FIG. 5 depicts an example of a time-labelling algorithm for synchronous terrestrial broadcasting in a single-frequency zone.

More precisely, the present algorithm is executed by the processor 200 of the time-labelling module 15 or 55.

At step E500, the processor 200 checks whether a packet of the DTT stream received is a TDT packet, the acronym for "Time and Date Table". TDT packets are packets as described in EN 300 468 V1.8.1.

If a TDT packet is received, the processor 200 passes to step E501.

At step E501, the processor 200 extracts the MJD field from the TDT packet detected.

MJD is the acronym for "Modified Julian Date" and contains the number of days elapsed since 1 Jan. 1900.

At the following step E502, the processor 200 calculates the number of days $N°_{day}$ elapsed since a predetermined date. The predetermined date is for example equal to Jan., 1 2013.

MJD (Jan., 1 2013)=56293 is the value of the MJD field at Jan., $1^{st}$ 2013.

$N°_{day}$ MJD-MJD (Jan., 1 2013).

At the following step E503, the processor 200 determines the number of loopbacks of the PCR counter. The PCR counter has a loopback period or in other words repetition of $2^{34}*300/27000000=190887.4354$ seconds. For example, the processor 200 calculates firstly the number of Duration seconds elapsed since Jan., 1 2013.

Duration=$N°_{day}$*86400+3600*h+60*min+sec, where h, min and sec are included in the MJD field.

The processor 200 next converts Duration into number of clock beats at 27 MHz, $Durée_{27}$=Duré* 27000000 $Duration_{27}$=Duration*27000000.

The processor 200 next calculates $Nb_{clkPCR}$ $N°_{clkPCR}$, the number of clock beats at 27 MHz equivalent to the period of the PCR counter.

The PCR counter comprises 33 most significant bits incremented whenever the 9 least significant bits of the counter reach the value 300:

$N°_{clkPCR}=2^{33}*300$

Finally, the processor 200 calculates the number of loopbacks of the PCR counter: $N°_{LoopbackPCR}$=$Duration_{27}$/$N°_{clkPCR}$ At the following step E504, the processor 200 checks whether a packet in the DTT stream received is an MIP packet.

If an MIP packet is received, the processor 200 passes to step E506.

At step E505, the processor 200 extracts the STS field from the MIP packet detected.

STS is the acronym for "Synchronization Time Stamp" and is described in ETSI 101-191.

The STS field is used, according to the present invention, as an initialisation value for the PCR counter for the first time-labelling packet for broadcasting in a single-frequency zone. The STS field is expressed in steps of 100 ns whereas the PCR counter is expressed in accordance with a 27 MHz clock.

At step E507, the processor 200 transposes the content of the STS field into clock beats at 27 MHz.

$STS_{27}(MIP(n))=STS(MIP(n))*27/10$

At the following step E507, the processor 200 initialises the PCR counter to the following value: $PCR_{27}(MIP(0))=$ $(STS_{27}N°_{LoopbackPCR}(0)*Offset_{LoopbackPCR})modulo$
$(27000000)$ where $Offset_{LoopbackPCR}=27000000-(2^{33}*300)$
$modulo(27000000)=27000000-19377600$ At the following step E508, the processor 200 checks whether a packet in the DTT stream is received.

If a packet in the DTT stream is received, the processor 200 passes to the following step E509.

If a packet in the DTT stream is not received, the processor 200 passes to step E510.

At step E509, the processor 200 increments the PCR counter by the number of clock beats at 27 MHz equivalent to the theoretical duration of the packet received.

At step E510, the processor 200 checks whether a packet containing a PCR field is to be transmitted. A packet containing a PCR field is transmitted approximately every 40 ms and is inserted in place of the first null packet of the DTT stream received. All the packets containing a PCR field inserted according to the present invention have an identifier different from the identifiers of the other packets transmitted and form a so-called reference service.

If a packet containing a PCR field is to be transmitted, the processor 200 passes to step E511 and inserts the value of the counter calculated at step E509 in the PCR field of the packet to be inserted and returns to step E507.

If a packet containing a PCR field is not to be transmitted, the processor 200 returns to step E507.

As the PCR counter and the STS field rely on synchronous clocks, the PCR and STS fields do not drift over time. Thus, at each MIP(n) packet, we have the following equations:

$$STS_{27}(MIP(n))=STS(MIP(n))*27/10 PCR(MIP(n))=\\PCR_{base}(MIP(n))*300+PCR_{ext}(MIP(n))\ PCR_{mod}(MIP(n))=PCR(MIP(n)) \text{modulo}(27000000)$$

thus $$STS_{27}(MIP(n))=PCR_{mod}(MIP(n))+No_{LoopbackPCR}(0)*\\Offset_{LoopbackPCR})\text{modulo}(27000000)$$

where $PCR_{base}(MIP(n))$ is a counter by the number of clock beats at 27 MHz.

Thus, it is possible to check at each MIP packet that the generation of the MIP packet is correct.

FIGS. 6a to 6f show an example of an algorithm for synchronising at least one stream received via a satellite connection for synchronous terrestrial broadcasting in a single-frequency zone.

More precisely, the algorithm in FIGS. 6a to 6e is executed by the processor 300 of the synchronisation and filtering device 30. Steps E619b to E621b are not executed by the processor 300 of the synchronisation and filtering device 30.

The algorithm in FIGS. 6a to 6c, 6e and 6f is executed by the processor 300 of the synchronisation and filtering device 60 for one of the streams received.

Figure 6A:
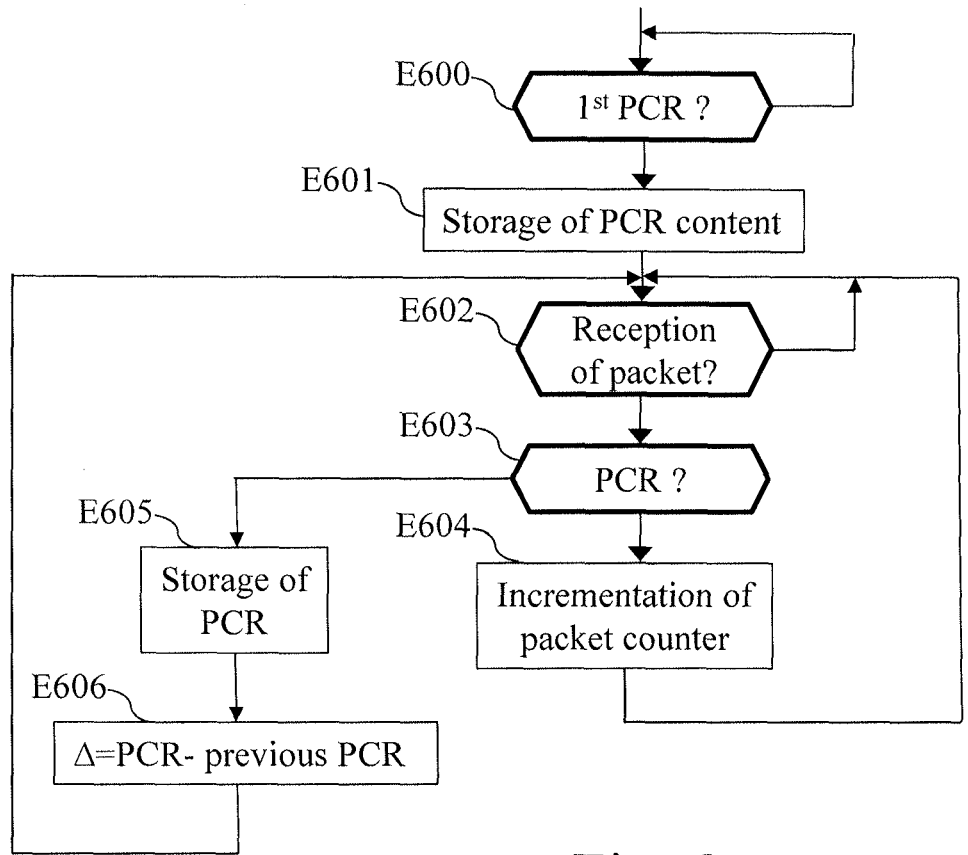
FIGS. 6a to 6f depict examples of synchronisation algorithms in at least one stream received by a satellite connection for synchronous terrestrial broadcasting in a single-frequency zone.
Figure 6B:
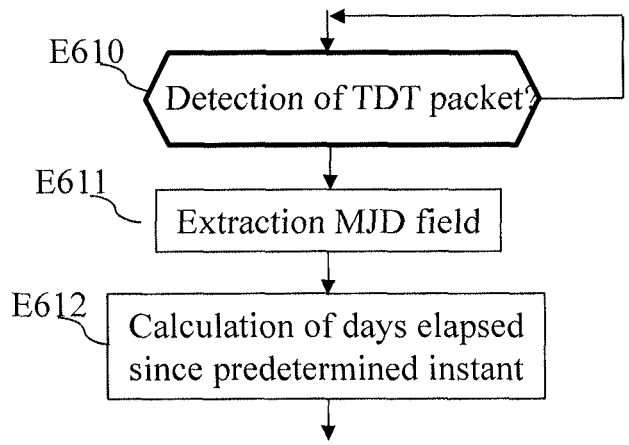
Figure 6C:
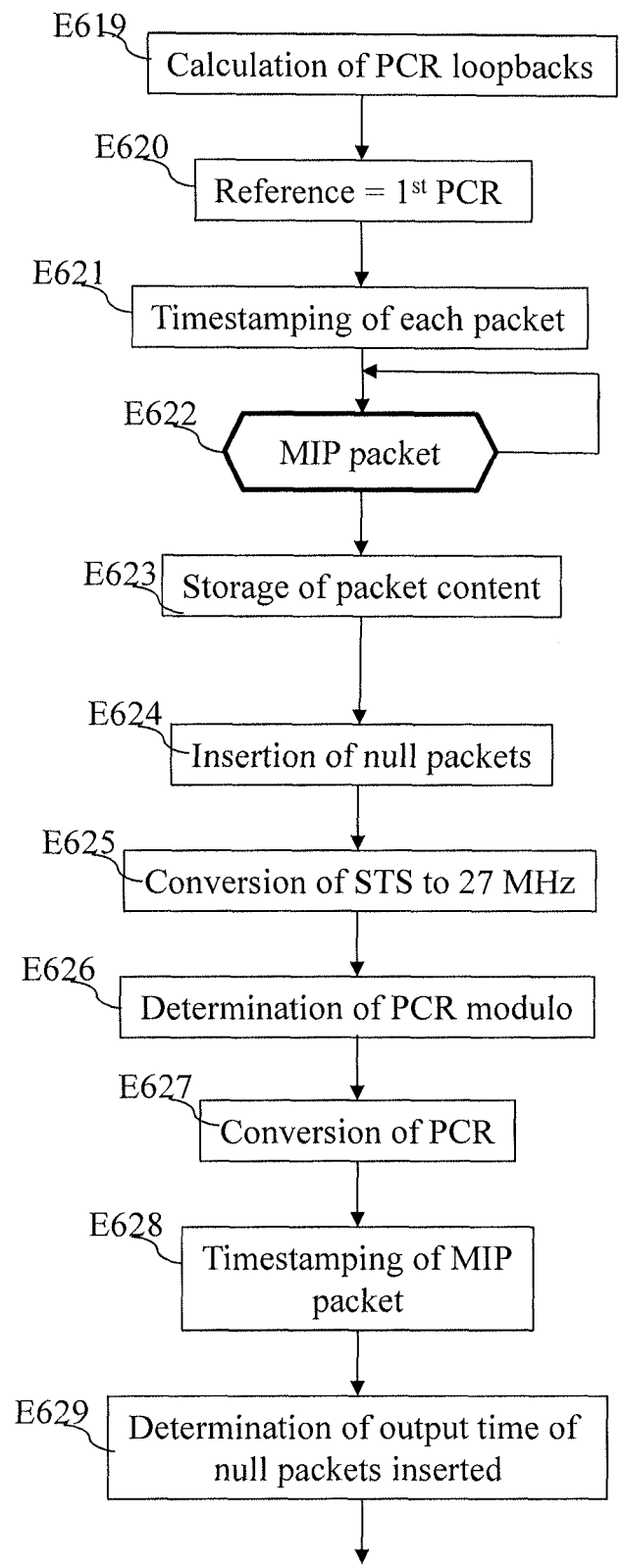

The algorithm in FIGS. 6a to 6b, 6e and 6f and steps E619b to E621b in FIG. 6c are executed by the processor 300 of the synchronisation and filtering device 60 for the other stream received.

At step E600, the processor 300 checks whether a first packet belonging to the reference service and containing a PCR field is received. These packets will be denoted REF (n,j) hereinafter.

If a first packet containing a PCR field and belonging to the reference service is received, the processor 300 passes to step E601.

At step E601, the processor 300 stores the content of the PCR field in the random access memory 302.

At the following step E602, the processor 300 detects whether a packet is received.

If a packet is received, the processor 300 passes to step E603.

At step E603, the processor 300 checks whether the packet received is a packet containing a PCR field and belonging to the reference service. If the packet received is a packet containing a PCR field and belonging to the reference service, the processor 300 passes to step E605. If not, the processor 300 passes to a step E604.

At step E604, the processor 300 increments a packet counter and returns to the step E602 already described.

At step E605, the processor 300 stores the content of the PCR field in the random access memory 302.

At step E606, the processor 300 calculates the difference Δ between the contents of the two PCR fields previously received. Once this operation is performed, the processor 300 returns to step E602. The difference Δ is equal to $PCR_{in}(REF(n,j))-PCR_{in}(REF(n-1,i))$.

The algorithm in FIG. 6b is executed by the processor 300 in parallel with the steps of the algorithm in FIG. 6a.

At step E610, the processor 300 checks whether a packet in the DTT stream received is a TDT packet, the acronym for "Time and Date Table". The TDT packets are packets as described in EN 300 468 V 1.8.1.

If a TDT packet is received, the processor 300 passes to step E611.

At step E611, the processor 300 extracts the MJD field from the TDT packet detected.

MJD is the acronym for "Modified Julian Date" and contains the number of days elapsed since 1 Jan. 1900.

At the following step E612, the processor 300 calculates the number of days $N°_{day}$ elapsed since a predetermined date. The predetermined date is for example Jan., 1 2013.

MJD (Jan., 1 2013)=56293 is the value of the MJD field at Jan., 1 2013.

$N°_{day}$=MJD−MJD(Jan., 1 2013).

The algorithm in FIG. 6c is executed by the processor 300 in parallel with the steps of the algorithm in FIG. 6a.

At step E619, the processor 300 calculates the number of loopbacks of the PCR counter. The PCR counter has a loopback period or in other words repetition of $2^{34}*300/27000000=190887.4354$ seconds. For example, the processor 200 calculates firstly the number of Duration seconds elapsed since Jan., 1 2013.

Duration=$N°_{day}*86400+3600*h+60*min+sec$ where h, min and sec are included in the MJD field.

The processor 300 next converts Duration into number of clock beats at 27 MHz, Durée$_{27}$=Durée 270000010Duration$_{27}$=Duration*27000000

The processor 300 next calculates $N°_{clkPCR}$, the number of clock beats at 27 MHz equivalent to the period of the PCR counter.

The PCR counter comprises 33 most significant bits incremented whenever the 9 least significant bits of the counter reach the value 300:

$$N°_{clk}PCR=2^{33}*300$$

Finally, the processor 200 calculates the number of loopbacks of the PCR counter:

$$N°_{LoopbackPCR}=\text{Duration}_{27}/N°_{clkPCR}$$

At step E620, the processor 300 takes as a reference the content of the first packet containing a PCR field stored at step E601.

At the following step E621, the processor 300 timestamps each packet received using the reference taken at step E620 as well as the difference calculated at step E605 in FIG. 6a.

The processor 300 timestamps each packet in the stream received and allocates to each packet p an input time $T_{in}(p)$.

For each packet p, the input time is calculated at follows:

$$T_{in}(p) = PCR_{in}(REF(n-1, i)) + \left(\frac{(PCR_{in}(REF(n, j)) - PCR_{in}(REF(n-1, i)))}{N}\right)*N_i$$

N is the number of packets in the stream received between the packets REF(n,j) and REF(n−1,i), namely the packets inserted at step E42 in FIG. 4. The packet REF(n−1,i) is the first packet inserted at step E42 in FIG. 4 preceding the packet p and the packet REF(n,j) is the first packet inserted at step E42 in FIG. 4 following the packet p.

$N_i$ is the number of packets in the stream received between the packets REF(n−1,i) and the packet p.

The processor 300 executes, at steps E619b to E621b, in parallel to the steps E619 to E621, timestamping of the packets in the other stream received in a similar manner to that described for steps 619 to E621. When the steps E621 and E621b are executed, the processor 300 passes to step E622.

The following steps E622 to E629 correspond to the creation of the reference stream.

At step E622, the processor 300 checks whether an MIP packet is received. If an MIP packet is received, the processor 300 passes to step E623.

At step E623, the processor 300 stores the content of the MIP packet received. The MIP packet contains an STS field as well as information that defines the modulation parameters used by the OFDM modulator 32. The processor 300 extracts the STS field from the MIP packet detected.

The STS field is used, according to the present invention, as an initialisation value for the PCR counter for the first time-labelling packet for broadcasting in a single-frequency zone. It should be noted here that the content of the STS field is not modified by the multiplexer 22 or 42 and 52.

At the following step E624, the processor 300 inserts a number of null packets between each MIP packet received. The number of packets inserted depends on the information that defines the modulation parameters used by the OFDM modulator 32 and which are included in the MIP packet or packets received.

The processor 300 thus forms a stream comprising MIP packets and null packets. This stream is for example referred to as the reference stream.

At step E625, the processor 300 transposes the content of the STS field into 27 MHz clock beats.

$$STS_{27}(MIP(n)) = STS(MIP(n))*27/10$$

The STS field is expressed in steps of 100 ns whereas the PCR counter is expressed according to a 27 MHz clock.

At the following step E626, the processor 300 determines the modulo of the PCR counter expressed using the 27 MHz clock from the following formula:

$$STS_{27}(MIP(n)) = STS(MIP(n))*27/10$$

$$PCR(MIP(n)) = PCR_{base}(MIP(n))*300 + PCR_{ext}(MIP(n)),$$

27 MHz clock beat counter $$PCR_{mod}(MIP(n)) = PCR(MIP(n)) \bmod{(27000000)}$$

The processor 300 executes this step in order to find the value of the PCR field before the multiplexing by the multiplexer 22.

At the following step E627, the processor 300 converts the modulo of the PCR counter expressed using the 27 MHz clock into the conventional format of a PCR counter, namely a 9-bit field that counts up to 300 and a 33-bit field that counts the loopbacks of the 9-bit field.

As the value $T_{in}(MIP(n))$ is very close to PCR(MIP(n)), the processor takes the part $PCR_{sec}$ corresponding to the integer part in number of seconds of the PCR field:

The processor 300 calculates:

$$PCR_{subsec}(MIP(n))=(T_{in}(MIP(n)) \bmod 27000000)$$
$$PCR_{sec}(MIP(n))=T_{in}(MIP(n))-PCR_{subsec}(MIP(n))$$

$PCR_{subsec}$ corresponds to the non-integer part of the PCR field expressed in seconds.

$PCR_{subsec}$ and $PCR_{sec}$ correspond to the value of the PCR before multiplexing by the multiplexer 22.

In order to take into account the changes in seconds during passage through the multiplexer 22, the following processing is carried out:

$$SiPCR_{subsec}(MIP(n))>0,95 \text{set} PCR_{mod}(MIP(n))<0,$$
$$0SsPCR(MIP(n))=PCR_{sec}(MIP(n))+1+PCR_{mod}(MIP(n))$$

$$SiPCR_{mod}(MIP(n))>0,95 \text{set} PCR_{subsec}(MIP(n))<0,$$
$$0SsPCR(MIP(n))=PCR_{sec}(MIP(n))-1+PCR_{mod}(MIP(n))$$

otherwise $$PCR(MIP(n))=PCR_{sec}(MIP(n))+PCR_{mod}(MIP(n))$$

At the following step E628, the processor 300 timestamps each MIP packet in accordance with the following formula:

$$T_{out}(MIP(n))=PCR(MIP(n))$$

At the following step E629, the processor 300 determines an output time for each null packet inserted:

The output time $T_{out}(i)$ of the packet i is defined by $$T_{out}(i)=T_{out}(MIP(n))+D_{out}(i,MIP(n))$$

$D_{out}(i, MIP(n))$ is the difference in time at the output of the device 300 between the packet i and the packet MIP(n) preceding the packet i.

The bit rate of the output stream of the synchronisation and filtering device 30 being known and fixed and dependent on the modulation parameters included in the MIP packets, the transmission time $\text{Duration}_{packet}$ of a TS packet is given by:

$$D_{out}(i,MIP(n))=\alpha*\text{Duration}_{packet}$$

α is the number of packets between the MIP packet and the packet i.

Thus we have the following formula:

$$T_{out}(i)=PCR(MIP(n))+\alpha*\text{Duration}_{packet}$$

Figure 6D:
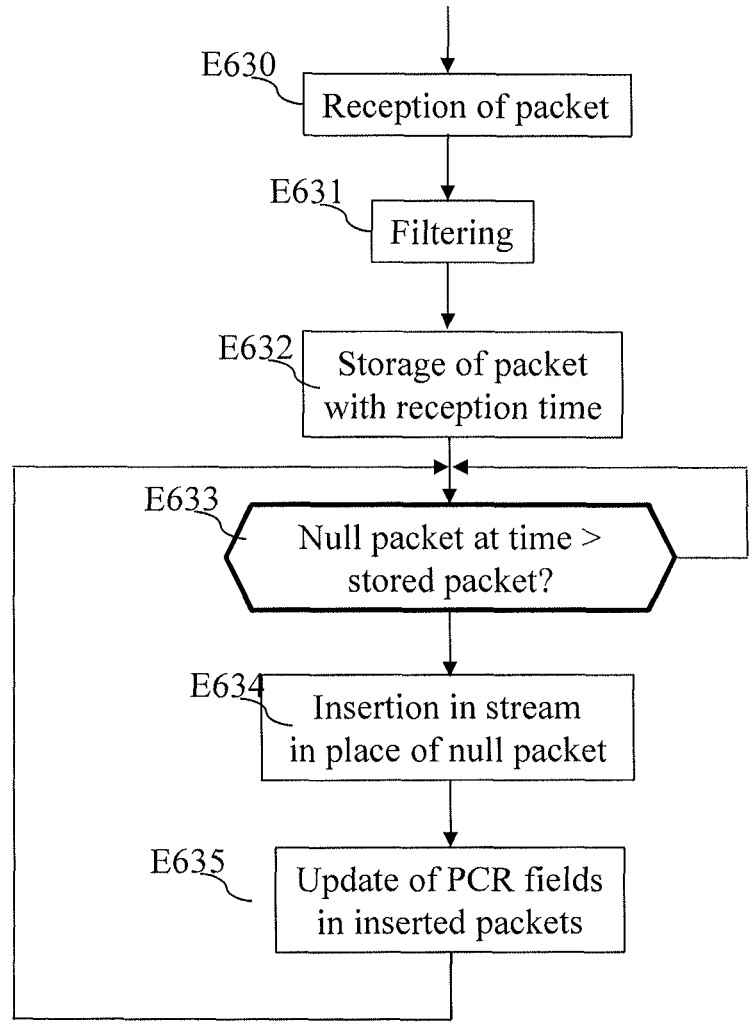

The algorithm in FIG. 6d is executed by the processor 300 in parallel with the steps of the algorithm in FIG. 6a.

At step E630, the processor 300 receives a packet by means of the antenna 31.

At the following step E631, the processor 300 carries out a filtering on the packet received. For this purpose, the processor 300 determines whether the packet received is a packet that is to be transmitted by the modulator 32 via the antenna 33.

I f the packet received is a packet that is to be transmitted by the modulator 32 via the antenna 33, the processor 300, at step E632, stores the packet as well as its reception time calculated at step E621 in the RAM memory 302.

At the following step E633, the processor 300 checks whether a null packet inserted at step E624 of the algorithm in FIG. 6c has a time greater than or equal to that of the packet stored at step E632.

If a null packet inserted at step E624 has a time greater than or equal to that of the packet stored at step E632, the processor 300 passes to step E634.

At step E634, the processor 300 inserts the packet stored at step E632 in place of the null packet the time of which is greater than or equal to that of the packet stored at step E632.

At step E635, the processor 300 updates the PCR fields contained in the packets.

For updating the PCR contained in the packet i, we have the following formula:

$$PCR_{out}(i)=PCR_{in}(i)+T_{out}(i)-T_{in}(i) \ PCR_{out}(i)=PCR_{in}(i)+T_{out}(MIP(n))+D_{out}(i,MIP(n))-T_{in}(i)$$

$T_{in}(i)$ is the input time of the packet i and $T_{out}(i)$ is the output time of the packet i.

Knowing that:

$$T_{out}(\mathrm{MIP}(n)) = \mathrm{PCR}(\mathrm{MIP}(n))$$

and $$T_{out}(i) = \mathrm{PCR}(\mathrm{MIP}(n)) + \alpha^* \mathrm{Duration}_{packet}\ \mathrm{PCR}_{out}(i) = \mathrm{PCR}_{in}(i) + \mathrm{PCR}(\mathrm{MIP}(n)) + \alpha^* \mathrm{Duration}_{packet} - T_{in}(i)$$

Once this step has been performed, the processor 300 returns to step E633.

Figure 6E:
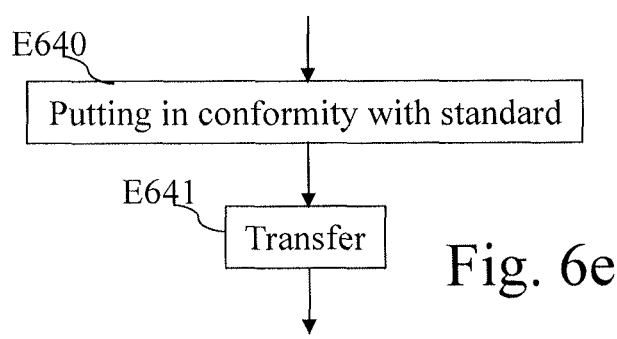

The algorithm in FIG. 6e is executed by the processor 300 in parallel with the steps of the algorithm in FIG. 6a.

At step E640, the processor 300 makes the stream generated by the algorithm in FIG. 6d conform to a transmission standard, for example ETSI 13818.

For example, the processor 300 inserts, in place of null packets, PSI tables that describe the content of the stream transmitted.

For example, at the startup of the synchronisation and filtering device 30 or when the tables are modified, the PAT (Program Association Table), PMT (Program Map Table), SDT (Service Description Table) and CAT (Conditional Access Table) tables are extracted from the DTH stream, and the tables are recalculated and stored. The filtering of the PIDs (Program Indication Tables) depends on the content of the PMTs of the services preserved.

The PCR counters are partly coded in 33 bits with a 90 kHz clock. Thus the sixteenth bit 16 keeps the value 0 for 728.1 ms and is at 1 for 728.1 ms. For example, this bit can be used when it goes to 0 as the time of initialisation for the insertion of signalling tables.

For example, the PAT and SDT tables are inserted at each initialisation instant. By way of example, the periods of insertion of the tables may be as follows; PAT, PMT, CAT: 2.912 s/16:182 ms: thus, in the time slot defined by bit 17 of the PCR counter, the processor 300 periodically inserts these tables 16 times in each period of 2.912 s.

SDT: 23.3 s/16=1.456 s, thus in the time slot defined by bit 19 of the PCR counter we periodically insert the SDT table 16 times in each period of 2.912 s.

NIT (Network Information Table): 93.2 s/16=5.825 s. It may be loaded into the equipment at the time of configuration.

The TDT (Time Date Table) and TOT (Time Offset Table) tables are directly copied to the DTH stream.

Figure 6F:
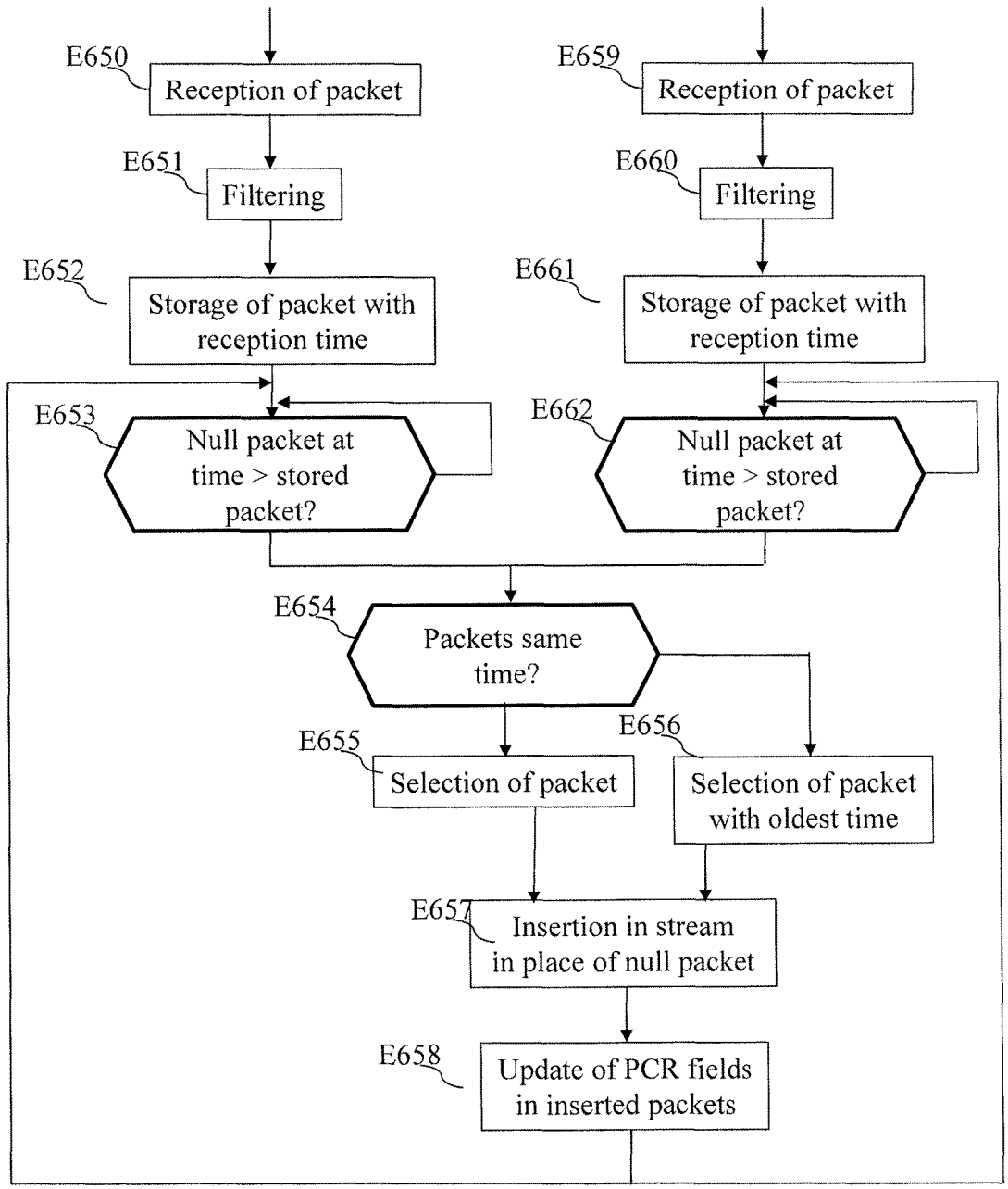

The algorithm in FIG. 6f is executed by the processor 300 of the synchronisation and filtering device 60 in parallel with the steps of the algorithm in FIG. 6a.

Steps E650 to E653 and E659 to E66 are executed in parallel for each stream received.

At step E650, the processor 300 receives a packet of a first stream by means of the antenna 61.

At the following step E651, the processor 300 carries out a filtering on the packet received. For this purpose, the processor 300 determines whether the packet received is a packet that is to be transmitted by the modulator 62 via the antenna 63.

If the packet received is a packet that is to be transmitted by the modulator 62 via the antenna 63, the processor 300, at step E652, stores the packet and its reception time calculated at step E621 in the RAM memory 302.

At the following step E653, the processor 300 checks whether a null packet inserted at step E624 of the algorithm in FIG. 6c has a time greater than or equal to that of the packet stored at step E652.

If a null packet inserted at step E624 has a time greater than or equal to that of the packet stored at step E652, the processor 300 passes to step E654. If not, the processor 300 returns to step E653 in order to process a new packet received and processed at steps E651 and E652.

At step E659, the processor 300 receives a packet of a first stream by means of the antenna 61.

At the following step E660, the processor 300 carries out a filtering on the packet received. For this purpose, the processor 300 determines whether the packet received is a packet that is to be transmitted by the modulator 62 via the antenna 63.

If the packet received is a packet that is to be transmitted by the modulator 62 via the antenna 63, the processor 300, at step E661, stores the packet and its reception time calculated at step E621b in the RAM memory 302.

At the following step E662, the processor 300 checks whether a null packet inserted at step E624 of the algorithm in FIG. 6c has a time greater than or equal to that of the packet stored at step E661.

If a null packet inserted at step E624 has a time greater than or equal to that of the packet stored at step E661, the processor 300 passes to step E654. If not, the processor 300 returns to step E662 in order to process a new packet received and processed at steps E660 and E661.

At step E654, the processor 300 compares the time of the packet stored at step E652 with the time of the packet stored at step E661.

If the time of the packet stored at step E652 and the time of the packet stored at step E661 are identical, the processor 300 passes to step E655. If the time of the packet stored at step E652 and the time of the packet stored at step E661 are different, the processor 300 passes to step E656.

At step E655, the processor 300 selects one of the packets stored at step E652 or E661 and passes to step E657. The selection is for example defined according to a constraint given by the user of the system.

At step E656, the processor 300 selects the packet stored at step E652 or E661 that has the oldest time and passes to step E657.

At step E657, the processor 300 inserts the packet selected at step E655 or E656 in place of the null packet the time of which is greater than or equal to that of the packet selected at step E655 or E656.

At step E658, the processor 300 updates the PCR fields contained in the packets.

For updating the PCR contained in the packet i, we have the following formula:

$$\mathrm{PCR}_{out} = \mathrm{PCR}_{in}(i) T_{out}(i) - T_{in}(i)\ \mathrm{PCR}_{out}(i) = \mathrm{PCR}_{in}(i) + T_{out}(\mathrm{MIP}(n)) + D_{out}(i, \mathrm{MIP}(n)) - T_{in}(i)$$

$T_{in}(i)$ is the input time of the packet i and $T_{out}(i)$ is the output time of the packet i.

Knowing that:

$$T_{out}(\mathrm{MIP}(n)) = \mathrm{PCR}(\mathrm{MIP}(n))$$

and $$T_{out}(i) = \mathrm{PCR}(\mathrm{MIP}(n)) + \alpha^* \mathrm{Duration}_{packet}\ \mathrm{PCR}_{out}(i) = \mathrm{PCR}_{in}(i) + \mathrm{PCR}(\mathrm{MIP}(n)) + \alpha^* \mathrm{Duration}_{packet} - T_{in}(i)$$

Once this step is performed, the processor 300 returns to step E653 and to step E662.

The invention claimed is:

1. A method for generating a time marking for synchronous terrestrial broadcasting in at least one single-frequency zone of at least one audiovisual stream via at least one connection in which the at least one audiovisual stream is multiplexed with at least one other audiovisual stream broadcast via the at least one connection, wherein the method comprises:

inserting packets comprising at least one item of information representing a common reference clock, detecting, in the audiovisual stream, at least one packet comprising information representing the number of days elapsed since a predetermined date, calculating the number of loopbacks of a counter during a given period from the information representing the number of days elapsed since a predetermined date, updating the counter at each packet in the audiovisual stream transmitted, inserting at least one packet comprising the value of the updated counter in the audiovisual stream in order to form a modified audiovisual stream, transmitting the modified audiovisual stream for broadcasting of said modified audiovisual stream.

2. The method according to claim 1, wherein the or each packet inserted comprising the value of the updated counter is inserted in the audiovisual stream in place of a null packet of the audiovisual stream and in accordance with a given periodicity.

3. The method according to claim 1, wherein each packet comprising the value of the updated counter has the same identifier, different from the other identifiers included in the audiovisual stream.

4. The method according to claim 1, wherein the calculation of the number of loopbacks of the counter during the given period from the information representing the number of days elapsed since a predetermined date is done by:

converting the given period into a number of beats of a clock of the counter, calculating the number of 27 MHz clock beats of the counter equivalent to the period of the counter, converting the content of a field of the packet comprising at least one item of information representing a common reference clock into clock beats of the counter.

5. The method according to claim 1, wherein the connection is a satellite connection.

6. A method for filtering and synchronising at least one audiovisual stream for synchronous terrestrial broadcasting in at least one single-frequency zone, the audiovisual stream being received via at least one connection in which the at least one audiovisual stream is multiplexed with at least one other audiovisual stream broadcast by the at least one connection, wherein the method comprises:

filtering, among the packets received via the at least one connection, audiovisual packets intended for synchronous terrestrial broadcasting in at least one single-frequency zone and timestamping of the filtered packets, detecting packets comprising a counter, calculation of the period between two packets comprising a counter and counting of the packets between the two packets comprising a counter, detecting, in the audiovisual stream, at least one packet comprising information representing the number of days elapsed since a predetermined date, detecting packets comprising at least one item of information representing a common reference clock, inserting null packets between each packet comprising at least one item of information representing a common reference clock, timestamping of each null packet, replacing each timestamped null packet with a filtered packet if the null packet has a timestamping higher than the filtered received packet, updating at least one packet comprising a counter in the audiovisual stream in order to form an audiovisual stream for synchronous terrestrial broadcasting in at least one single-frequency zone.

7. The method according to claim 6, wherein the method further comprises making the audiovisual stream for synchronous terrestrial broadcasting in at least one single-frequency zone conform to a transmission standard.

8. The method according to claim 7, wherein a plurality of tables are inserted in the audiovisual stream for synchronous terrestrial broadcasting in at least one single-frequency zone at a periodicity that depends on the periodicity of at least one bit of the counter.

9. The method according to claim 6 wherein at least one connection is a satellite connection.

10. A device for generating a time marking for synchronous terrestrial broadcasting in at least one single-frequency zone of at least one audiovisual stream via at least one connection in which the at least one audiovisual stream is multiplexed with at least one other audiovisual stream broadcast by the at least one connection, wherein the device comprises circuitry configured for:

inserting packets comprising at least one item of information representing a common reference clock, detecting, in the audiovisual stream, at least one packet comprising information representing the number of days elapsed since a predetermined date, calculating the number of loopbacks of a counter during a given period from the information representing the number of days elapsed since a predetermined date, updating the counter at each packet in the audiovisual stream transmitted, inserting at least one packet comprising the value of the updated counter in the audiovisual stream in order to form a modified audiovisual stream, transmitting the modified audiovisual stream for satellite broadcasting of said modified audiovisual stream.

11. A device for filtering and synchronising an audiovisual stream for synchronous terrestrial broadcasting in at least one single-frequency zone, the audiovisual stream being received via at least one connection in which the at least one audiovisual stream is multiplexed with at least one other audiovisual stream broadcast via the at least one connection, wherein the device comprises circuitry configured for:

filtering, among the packets received via the at least one connection, audiovisual packets intended for synchronous terrestrial broadcasting in at least one single-frequency zone and timestamping of the filtered packets, detecting packets comprising a counter, calculating the period between two packets comprising a counter and counting the packets between the two packets comprising a counter, detecting, in the audiovisual stream, at least one packet comprising information representing the number of days elapsed since a predetermined date, detecting packets comprising at least one item of information representing a common reference clock, inserting null packets between each packet comprising at least one item of information representing a common reference clock, timestamping each null packet,
replacing each timestamped null packet with a filtered packet if the null packet has a timestamping higher than the filtered received packet,
updating at least one packet comprising a counter in the audiovisual stream in order to form an audiovisual stream for synchronous terrestrial broadcasting in at least one single-frequency zone.

* * * * *